United States Patent [19]
Iijima

[11] 3,900,774
[45] Aug. 19, 1975

[54] OIL-IMPREGNATED CAPACITOR
[75] Inventor: Yasuo Iijima, Kobe, Japan
[73] Assignee: Matsushita Electric Industrial Co., Ltd., Osaka, Japan
[22] Filed: Dec. 26, 1973
[21] Appl. No.: 427,690

[30] Foreign Application Priority Data
Dec. 28, 1972 Japan............................. 47-3328
Feb. 5, 1973 Japan............................. 46-14890
Sept. 18, 1973 Japan............................. 46-105730

[52] U.S. Cl............................. 317/258; 317/260
[51] Int. Cl............................. H01g 3/195
[58] Field of Search............................. 317/258, 260

[56] References Cited
UNITED STATES PATENTS
3,363,156  1/1968  Cox............................. 317/258 X
3,585,467  6/1971  Linzey............................. 317/258

FOREIGN PATENTS OR APPLICATIONS
223,198  7/1959  Australia............................. 317/258

OTHER PUBLICATIONS
Propylene in Applied Plastics, Nov. 1961, p. 62.

*Primary Examiner*—E. A. Goldberg
*Attorney, Agent, or Firm*—Stevens, Davis, Miller & Mosher

[57] ABSTRACT

An oil-impregnated capacitor has a plastic dielectric with a haze value greater than 20%. The haze results in a higher CSV and breakdown voltage. The plastic can also be roughened.

6 Claims, 7 Drawing Figures

{ A CORRESPONDS TO THE INSULATION STRUCTURE OF FIG.2.
  B CORRESPONDS TO THE INSULATION STRUCTURE OF FIG.3.

{ A CORRESPONDS TO INSULATION STRUCTURE OF FIG.2.
  B CORRESPONDS TO INSULATION STRUCTURE OF FIG.3.

OIL-IMPREGNATED CAPACITOR

This invention relates to an oil-impregnated capacitor.

The oil-impregnated capacitor has heretofore used capacitor paper and craft insulation paper for the thin insulator sheet. Recently, plastic films have also been used as part of the thin insulator sheet. The presently employed plastic film, however, is given no consideration about the surface roughness and haze related to the internal crystalline state.

Also, no restriction is made about the total light transmission of the film which is related to the impurity concentration and physical defects resulting at the time of formation of the film.

The plastic film presently used for the oilimpregnated capacitor tends to have a smooth surface in order to obtain uniformity of the thickness of the film. This tendency, however, cannot be said to be suited for the thin insulator sheet of the oil-impregnated capacitor.

An object of the invention is to increase the dielectric strength and reduce the size and weight of the oil-impregnated capacitor using the plastic film and also reduce the power loss by using a great deal of plastic film prone to lower power loss.

The oil-impregnated capacitor has the following features:

1. Impregnation with insulating oil can be readily made.
2. Adequate quantity of interfilm insulating oil can be ensured.
3. Interfilm voids are less likely to result. Also, the corona starting voltage is improved by virtue of the adequate oil content, and deterioration due to corona discharge is less likely to result.
4. It is possible to design a new type of capacitor. For example, it is possible to design an oil-impregnated capacitor of the sole plastic film type having high potential gradient and an oil-impregnated capacitor of the sole plastic film type having evaporation electrodes.

The above objects, features and advantages of the invention will become more apparent from the following description in conjunction with the accompanying drawings, in which.

According to the invention, restrictions are made on the surface state of the plastic film used as the oil-impregnated thin insulator sheet.

Figure 1:
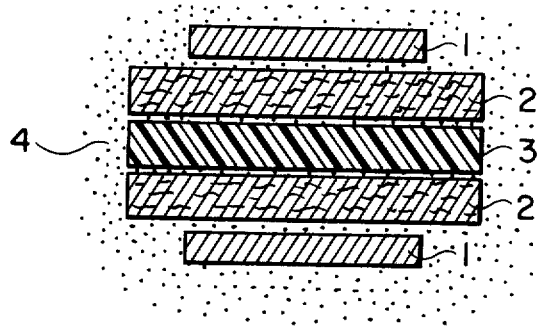
FIG. 1 is a view showing a first insulation structure of a model capacitor according to the invention.
Figure 2:
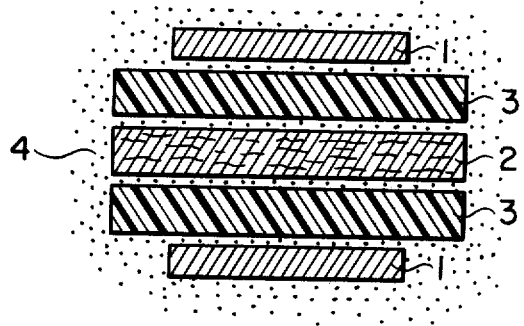
FIG. 2 is a view showing a second insulation structure of a model capacitor according to the invention.

FIGS. 1 and 2 show typical insulation structures using plastic film in combination with capacitor paper. The structure of FIG. 1 is usually employed and is commonly termed sandwich type. In the FIGURE, reference numeral 1 designates electrode metal foil (such as aluminum foil), numeral 2 capacitor paper, numeral 3 plastic film, and numeral 4 insulating oil with which the capacitor paper and plastic film are impregnated. The structure of FIG. 2 is termed converse sandwich type, and it is superior to the previous structure of FIG. 1 because the plastic film is used much more. In FIG. 2, numeral 1 designates electrode metal foil (such as aluminum foil), numeral 2 capacitor paper, numeral 3 plastic film, and numeral 4 insulating oil with which the capacitor paper and plastic film are impregnated.

Figure 3:
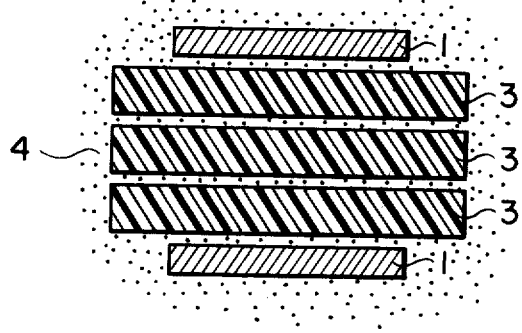
FIG. 3 is a view showing a third insulation structure of a model capacitor according to the invention.

FIG. 3 shows an insulation structure using solely the plastic film as the dielectric. In the Figure, numeral 1 designates electrode metal foil (such as aluminum foil), numeral 3 plastic film, and numeral 4 insulating oil with which the plastic film is impregnated. This structure encounters great difficulties in the impregnation with the insulating oil. With this structure, the heretofore obtainable potential gradient is about 20 V/$\mu$ at the most, so that this type of structure has been thought to be incapable of providing an economical capacitor. An economically feasible capacitor has to have a potential gradient of at least 30 V/$\mu$.

The effects attainable according to the invention will be best understood from the following experiments.

EXPERIMENT 1

Figure 4:
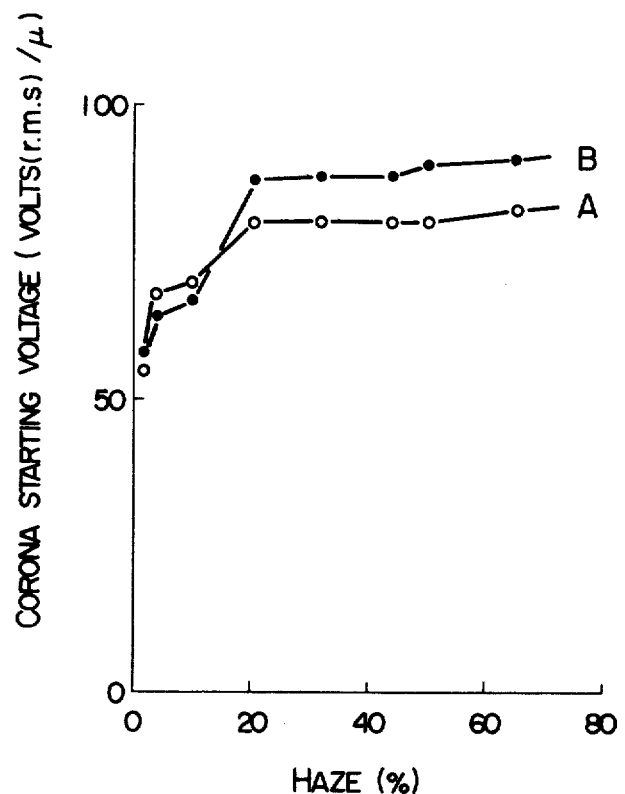
FIG. 4 is a graph showing the relationship between corona starting voltage and haze of some plastic films.
Figure 5:
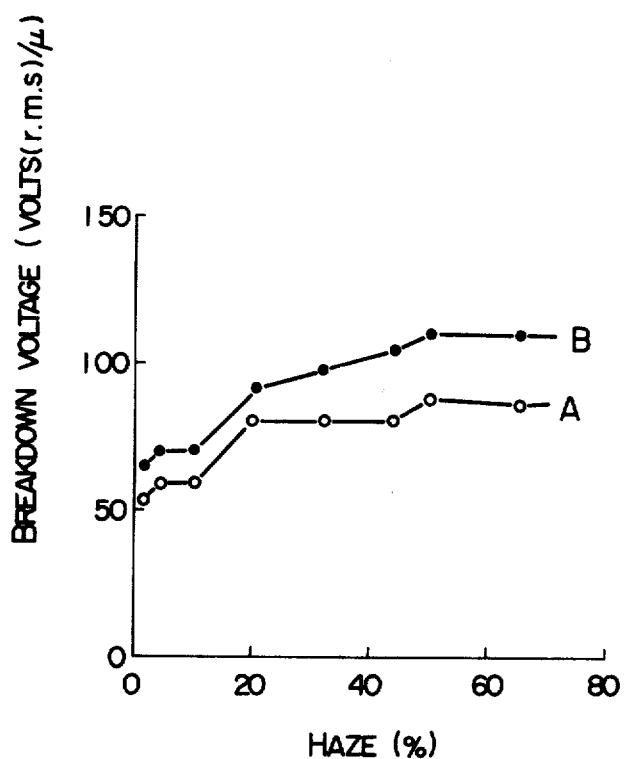
FIG. 5 is a graph showing the relationship between breakdown voltage and haze of some plastic films.

Model capacitors having the insulation structures of FIGS. 2 and 3 were manufactured by using aluminum foil for the electrodes and polypropylene films of various haze values to study their properties. FIG. 4 shows the corona starting voltage of the model capacitors. Labeled A are values obtained with the insulation structure of FIG. 2, and labeled B are values obtained with the insulation structure of FIG. 3. It will be seen that the corona starting voltage greatly varies with the haze of the plastic film. The variation is particularly pronounced in case of the sole plastic film type capacitors as shown in FIG. 3. FIG. 5 shows the breakdown voltage of the model capacitors. In the Figure, labeled A are values obtained with the insulation structure of FIG. 2, and labeled B are values obtained with the insulation structure of FIG. 3. The breakdown voltage again greatly varies with the haze of the plastic film. In either case of FIG. 4 or FIG. 5, satisfactory results could be obtained where the haze is above 10 percent and particularly above 20 percent.

EXPERIMENT 2

Model capacitors having the structure of FIG. 3 were manufactured by using plastic films of the same material but having various values of total light transmission factor (according to the measuring method prescribed in ASTM-D1003) and haze (according to the measuring method prescribed in ASTM-D1003) as listed in Table 1 below. Table 2 below shows the corona starting voltage, tan $\delta$ and breakdown voltage of these model capacitors. Particularly satisfactory results could be obtained where the total light transmission factor is above 80 percent.

Table 1

| Model No. | Transmission factor (%) | Haze (%) |
|---|---|---|
| 1 | 95.3 | 43.9 |
| 2 | 94.5 | 4.2 |
| 3 | 80.2 | 38.7 |
| 4 | 81.5 | 5.0 |

Table 1-Continued

| Model No. | Transmission factor (%) | Haze (%) |
|---|---|---|
| 5 | 75.0 | 42.5 |
| 6 | 74.0 | 5.7 |

Table 2

| Model No. | Corona starting voltage (V/μ) | Tan δ (%) | Breakdown voltage (V/μ) |
|---|---|---|---|
| 1 | 88 | 0.005 | 105 |
| 2 | 64 | 0.005 | 70 |
| 3 | 87 | 0.05 | 95 |
| 4 | 42 | 0.03 | 65 |
| 5 | 65 | 0.10 | 72 |
| 6 | 48 | 0.09 | 60 |

EXPERIMENT 3

Figure 6:
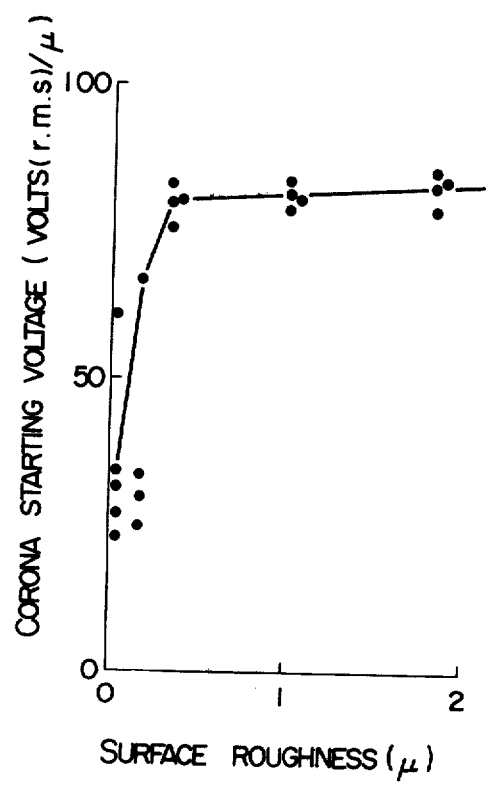
FIG. 6 is a graph showing the relationship between corona starting voltage and surface roughness of model capacitors.
Figure 7:
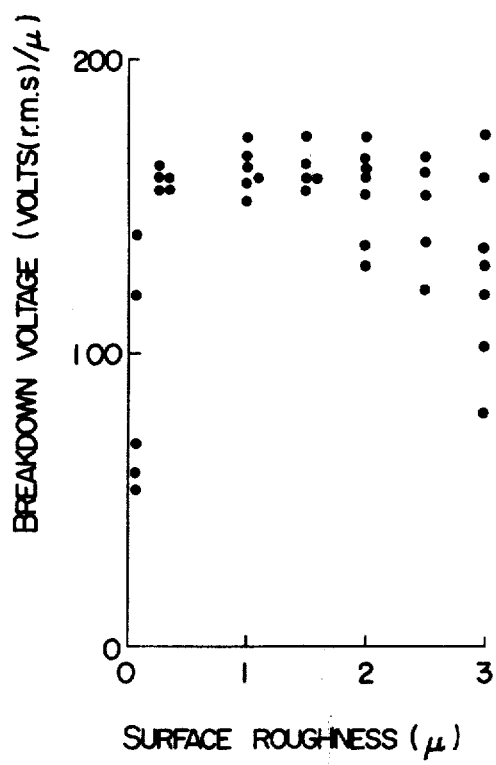
FIG. 7 is a graph showing the relationship between breakdown strength and surface roughness of model capacitors.

Model capacitors having the structure of FIG. 3 were manufactured by using plastic films of the same material as used in the previous Experiment 1 but varying in surface roughness. FIGS. 6 and 7 respectively show the corona starting voltage and breakdown voltage of these model capacitors. Satisfactory results could be obtained where the surface roughness is 0.3 to 1.5 μ Ra according to the measuring method prescribed in JIS-B 0601.

While the above experiments were made by using polypropylene film, similar experiments were also conducted by using other plastic films such as polystyrene, polyethylene, polyester and polycarbonate films and further with deposition thin film capacitors, and similar results could be recognized.

A specific example of the oil-impregnated capacitor manufactured in accordance with the invention is given below.

EXAMPLE 1

A high voltage capacitor having the insulation structure of FIG. 3, with rated voltage of 6.6 kV and capacity of 100 kVA, was manufactured. Polypropylene was used for the plastic film. This capacitor is greatly set apart from a capacitor having the insulation structure of FIG. 1, particularly in tan δ, corona starting voltage, average design potential gradient, temperature rise and weight, as listed in Table 3 below. In the other characteristics, however, no particular difference from the prior art capacitor could be found. This capacitor is now being tested for its life of continuous use for a period in excess of 10 thousand hours.

Table 3

|  | Capacitor according to the invention | Prior art Capacitor |
|---|---|---|
| Rated voltage, capacity | 6.6 kV, 100 kVA | 6.6 kV, 100 kVA |
| Average potential gradient | 41.3 V/μ | 27.5 V/μ |
| Tan δ (at 20°C) | 0.01 % | 0.15 % |
| Corona starting voltage | 15 kV or above | 14 kV or above |
| Temperature rise (at 30°C) | 2 deg. or less | 15 deg. |
| Weight | 45 kg | 69 kg |

What we claim is:

1. An oil-impregnated capacitor having a thin insulator sheet sandwiched between two electrodes, said thin insulator sheet consisting of a plastic film having haze no lower than 20 percent.

2. The oil-impregnated capacitor according to claim 1, wherein the total light transmission of said plastic film is no lower than 80 percent.

3. The oil-impregnated capacitor according to claim 1, wherein the surface roughness of said plastic film is within a range between 0.3 and 1.5 μ Ra.

4. The oil-impregnated capacitor according to claim 1, wherein said thin insulator sheet solely consists of the plastic film.

5. The oil-impregnated capacitor according to claim 4, wherein said electrodes are constituted by a metal evaporation film.

6. The oil-impregnated capacitor according to claim 4, wherein said plastic film is made of polypropylene.

* * * * *